US005518803A

United States Patent [19]

Thomas

[11] Patent Number: 5,518,803

[45] Date of Patent: May 21, 1996

[54] METHOD FOR DECORATING MESH MATERIALS

[76] Inventor: Rick E. Thomas, 11641 SE. 128th Place Rd., Ocklawaha, Fla. 32179

[21] Appl. No.: 323,391

[22] Filed: Oct. 14, 1994

[51] Int. Cl.[6] .................... B32B 3/00

[52] U.S. Cl. .................... 428/195; 427/282; 427/287; 427/288; 427/421

[58] Field of Search .................... 427/282, 288, 427/287, 421; 428/195

[56] References Cited

U.S. PATENT DOCUMENTS

| | | | |
|---|---|---|---|
| D. 274,944 | 7/1984 | Coppa | D25/48 |
| 3,492,943 | 2/1970 | Miller et al. | 101/127.1 |
| 4,023,524 | 5/1977 | Goldfarb et al. | 118/301 |
| 4,103,052 | 7/1978 | Summers et al. | 428/38 |
| 4,547,406 | 10/1985 | Armstrong | 427/282 |
| 4,562,107 | 12/1985 | Daniels | 427/288 X |
| 4,702,942 | 10/1987 | Wood | 427/259 |
| 4,704,961 | 11/1987 | Jensen et al. | 101/114 |
| 4,747,346 | 5/1988 | Geel | 427/288 X |
| 4,749,611 | 6/1988 | Furuya | 428/229 |
| 4,878,532 | 11/1989 | Streinieks | 160/332 |
| 4,951,566 | 8/1990 | Melzer et al. | 101/123 |
| 5,038,714 | 8/1991 | Dye et al. | 118/504 |
| 5,050,498 | 9/1991 | Smith | 101/127.1 |
| 5,067,400 | 11/1991 | Bezella et al. | 101/129 |
| 5,127,321 | 7/1992 | Proffer | 101/115 |
| 5,148,745 | 9/1992 | Hamm | 101/127.1 |
| 5,156,684 | 10/1992 | Mayer et al. | 118/301 |
| 5,193,457 | 3/1993 | Hahn et al. | 101/129 |
| 5,243,905 | 9/1993 | Webber | 101/128 |
| 5,273,780 | 12/1993 | Borger et al. | 427/163 |

*Primary Examiner*—Michael Lusignan

*Attorney, Agent, or Firm*—Richard W. Evans; Michael G. Johnston; Moore & Van Allen

[57] ABSTRACT

A method for decorating one side of a mesh material comprising the steps of providing a printing screen, positioning the printing screen adjacent the mesh materials, and applying a coloring medium on the areas of the mesh which are exposed through the printing screen. The step of applying coloring medium comprises spraying the coloring medium, such as paint or ink, on the areas of the mesh materials which are exposed through the printing screen. The step of applying the coloring medium is repeated for each different color coloring medium. By this method, paint or ink is sprayed or otherwise forced through the printing screen and onto the mesh material in such a way that only the exposed, facing surface of the fiber of the mesh material receives an application of coloring medium creating a sharp, detailed design on only one side of the mesh material.

26 Claims, 1 Drawing Sheet

METHOD FOR DECORATING MESH MATERIALS

BACKGROUND

This invention relates generally to a method for decorating mesh materials, and more particularly concerns a method for decorating mesh materials wherein a decorative design is visible from only one side of the materials.

PROBLEM TO BE SOLVED

Decorating mesh materials, such as insect or porch screen, is a means for improving the visual appearance of the materials. The decoration can be any type of design or display suited to one's personal preference. On the practical side, the decoration can be an advertisement or convey other useful information. The decoration also increases privacy by drawing the eyes away from what, or who, is behind the mesh material, to the decoration itself. Achieving visual enhancement of mesh materials has been difficult, if not impossible, to accomplish due to a number of problems. For example, when applying paint or ink to mesh materials, the open areas of the mesh fill with the paint or ink causing an undesirable appearance, especially from the undecorated side of the material. Furthermore, where the mesh material is insect or porch screen, airflow and visibility through the screen from the undecorated side is thereby diminished.

All known methods for decorating mesh materials pose a host of problems. In addition to open area blockage, few methods can handle mesh materials sized to function as outdoor screen enclosures. Moreover, the cost of some known printing methods has proven prohibitive for decorating mesh materials.

A free-hand approach to decorating mesh materials results in a sloppy appearance and is difficult to accomplish with any consistency or uniformity. Painting mesh materials with a brush or roller always results in plugging the openings of the materials which, as noted above, is unacceptable. Using hand-cut stencils to apply a design will cause the ink or paint to run or bleed between the mesh material and the stencil and cause the edges of the decorative design to be undefined and generally lack detail.

In conventional screen printing, a relatively viscous ink is placed onto a printing screen and is forced through the printing screen and onto an underlying substrate by the wiping action of a squeegee or the like. However, because the fibers of mesh materials are rough and uneven, the well-known screen printing technique is not an acceptable alternative for decorating mesh materials. Not only is the technique itself difficult, requiring a very accomplished and patient printer to effectively implement the technique, but it would be nearly impossible to apply a consistent layer of ink to the large, irregular surfaces of mesh materials of about 30 to 40 square feet or more. Also, typical vinyl ink used to decorate vinyl insect or porch screens would dry quickly on the printing screen causing blocked areas. Moreover, a simple four-color design would require four separate printing screens. A tremendous amount of ink would be wasted as a result.

Theoretically, transferring wet ink from a plate and pad to mesh materials would be an acceptable approach given the proper equipment. However, pads and plates which are large enough for use on insect or porch screens are not regularly manufactured and entirely impractical. Pad printing was designed for irregular surfaces such as golf balls, ink pens, buttons, and the like, but not for surfaces exceeding about 12 inches by about 17 inches. Even if such large pads and plates were manufactured, they would be cost-prohibitive. Also, a multicolor design would require a pad and plate for each color and a huge holder for proper registration. Accordingly, pad printing is not an acceptable alternative for applying large designs to mesh materials.

Offset presses are automatic machines designed to print cut paper stock or rolled materials. The largest size of material offset presses can accommodate, however, is about 40 inches by about 60 inches. Mesh materials can be any size, including insect and porch screens as wide as about 72 inches or more. Furthermore, because printing drums are used in these machines, the maximum height of each design is limited to the circumference of the drum. Also, offset press printing is very expensive requiring set-up costs of about $1,000 or more per color. Additionally, because such presses are designed for mass production, a single custom job would not be possible or economical. A custom-made offset press machine could be designed to be utilized for large mesh materials; the cost, however, would be prohibitive.

Due to the above-mentioned problems, mesh materials have remained plain and devoid of any colorful design or visual enhancement. For the foregoing reasons, there is a need for a method for decorating mesh materials which does not block the open areas in the mesh, creates a design which is visible only from one side of the materials and consistently provides a clear, sharp, highly-detailed design. The method should also be capable of decorating very large mesh materials typical of insect or porch screens. Finally, the method should be affordable and simple enough for an individual of limited artistic ability to perform.

SUMMARY

The present invention is directed to a method that satisfies these needs. A method for decorating mesh materials having the features of the present invention, comprises the steps of providing a printing screen, positioning the printing screen adjacent the mesh materials, and applying a coloring medium on the areas of the mesh which are exposed through the printing screen.

The step of providing a printing screen comprises providing a printing screen having a mesh count and mesh openings corresponding to the mesh count and mesh openings of conventional screen printing screens. Where the object is to create a color pattern rather than uniformly color the entire facing surface of the mesh material, the printing screen will have a blocked portion blocking passage of the coloring medium through the printing screen whereby the coloring medium may only pass through the openings at the remaining unblocked portion of the printing screen.

The step of applying the coloring medium comprises spraying the coloring medium, such as paint or ink, on the areas of the mesh materials which are exposed through the printing screen. The step of applying the coloring medium is repeated for each different color of coloring medium.

Accordingly, it is an object of the present invention to provide a new and useful method for decorating mesh materials having one or more of the novel features of this invention as set forth above or hereinafter shown or described.

Another object of the present invention is to provide a method of decorating mesh materials which does not fill the open areas of the mesh material with paint or ink.

A further object of the present invention is to provide a method of decorating mesh materials which leaves airflow and visibility through the mesh material virtually undiminished.

A still further object of the present invention is to provide a method of decorating mesh materials which creates a clear, sharp detailed design on only one side of mesh materials.

It is a feature of this invention that the coloring medium is sprayed through a printing screen and onto the mesh material in such a way that the only exposed, facing surface of the fiber of the mesh material receives an application of coloring medium. The decorated side is crisp, clear, richly colored and detailed. From the undecorated side, however, the design is not visible. This allows a clear, unobstructed view through the decorated mesh material.

Another feature of this invention is that multi-color designs can be created quickly and easily.

Because the eyes are drawn to the art on the screen and away from what, or who, is behind the mesh material, the decorated mesh material also functions as a powerful, yet subtle privacy feature. The advantages of the method are that it is inexpensive and simple, even when a multi-colored design is desired, and does not require artistic talent to accomplish. The new method is also an effective way to decorate any size or type of mesh material including six-foot or eight-foot designs. There are no expensive color separations and set-up for mass-production does not require extensive capital investment.

DESCRIPTION

Figure 1:
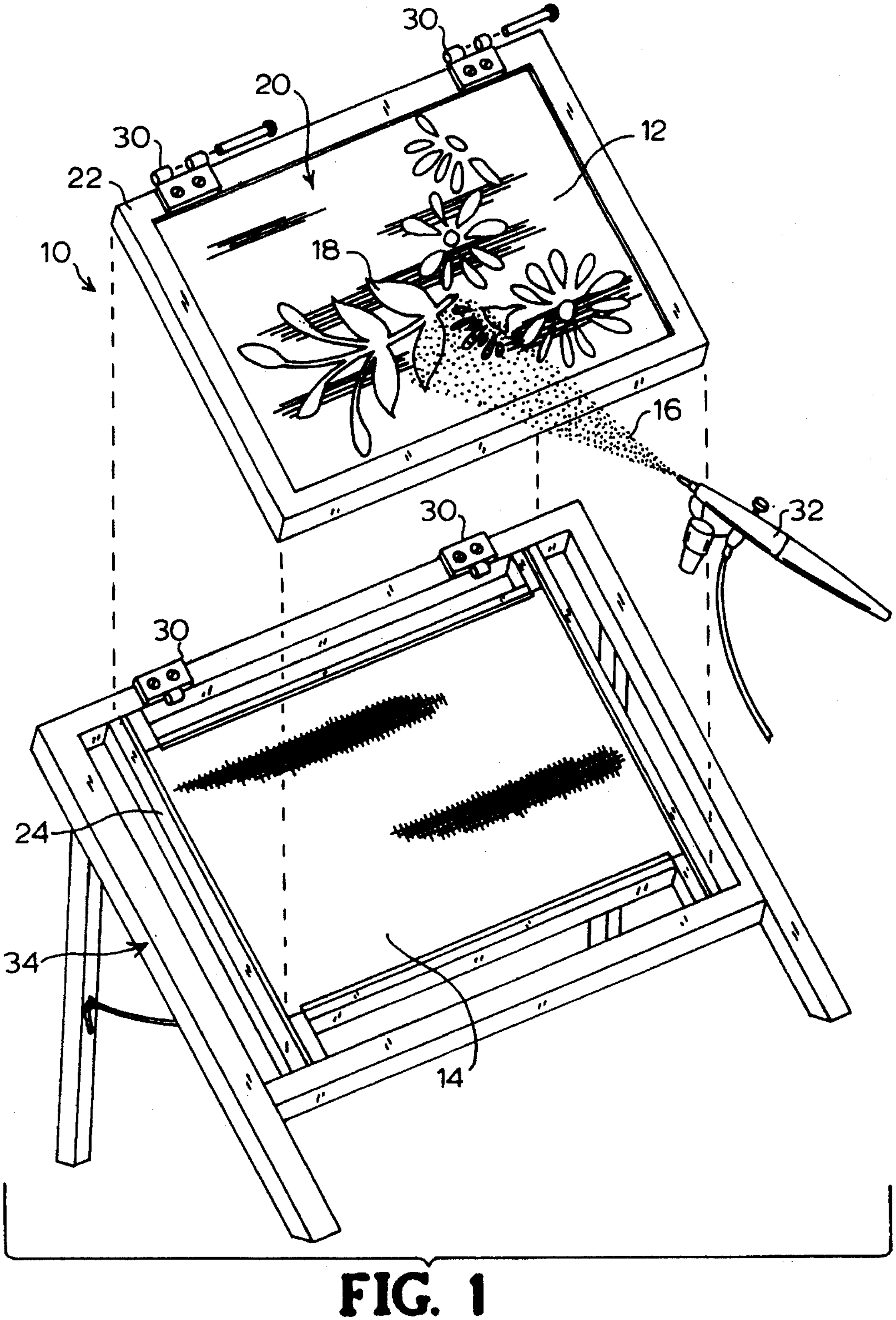
FIG. 1 is a perspective view of an embodiment of an apparatus useful for accomplishing the method of the present invention illustrating the various features thereof.

A typical method in accordance with the method of the present invention is given by way of illustration and not by way of limitation in order that those skilled in the art may better understand the present invention. As shown in FIG. 1, one possible embodiment of the method for decorating mesh material of the present invention, denoted generally by the numeral 10, comprises the steps of providing a printing screen 20, positioning the printing screen 20 adjacent the mesh material 14, and applying a coloring medium 16 through the printing screen 20 to the exposed, facing areas of the mesh material 14.

Virtually any type of mesh material 14 may be decorated by the method of the present invention 10 including insect or porch screen, woven cloth, burlap, perforated plastic sheets, and the like. The method of the present invention 10 is particularly suited for insect or porch screen such as that used for outdoor screen enclosures. As is well known in the art, insect or porch screens comprise woven strands of metal, vinyl or other suitable materials. For example, typical vinyl screen is available from New York Wire, of Mt. Wolf, Pa., U.S.A., under the name of GOLD STRAND.

The mesh materials 14 to be decorated can be any size or shape. Insect or porch screen, for example, is typically sized to fit an opening in a structure and thus can be any conceivable shape or size. Large insect or porch screens can be about 50 square feet or more.

To facilitate decoration by the method of the present invention 10, the mesh material 14 is securely mounted to a holder such as a frame 24, or any other solid surface, by securing the peripheral edges of the mesh material 14 in taut condition to the frame 24. As shown in FIG. 1, the mesh material 14 may be mounted to a frame 24 which itself may be secured to a stationary support such as an easel 34.

The step of providing a printing screen 20 comprises providing a sheet of screen material having openings therein. The printing screen 20 screen material may be any suitable perforate material: The printing screen 20 can be sized and shaped to correspond to any size or shape of mesh material 14. The printing screen 20 serves to diffuse the coloring medium 16 particles as they pass through the printing screen 20, essentially stopping some and letting others pass.

The printing screen 20 is preferably comprised of woven threads having a mesh count and mesh openings corresponding to the mesh count and mesh openings of conventional screen printing screens. Each thread comprises either one strand of fiber, which is known as monofilament, or many strands of fiber, which is referred to as multifilament. The fibers can be silk or metal, but are more commonly nylon or polyester. Monofilament screen is the preferred printing screen in the method of the present invention because it is easier to clean and reclaim. Multi filament printing screens tend to trap coloring medium and cleaner residues between the fibers thereby blocking some areas.

Printing screen is differentiated based on the number of threads per square inch or "mesh". Printing screen having more threads per square inch consequently has finer openings in the screen. Conversely, a coarse screen has fewer threads per square inch. Individual thread thickness may also vary. The preferred printing screen mesh is one that will allow the correct amount of coloring medium 16 to penetrate the printing screen 20 and be deposited on only the exposed, facing top of the fibers of the mesh material 14. By using different mesh counts, the amount of coloring medium 16 that passes through the printing screen 20 to the top of the mesh material 14 can be varied. A more coarse mesh allows larger and more coloring medium 16 particles to be applied to the mesh material 14, but also results in some loss of control and detail.

The method of the present invention is conducted with a printing screen mesh of from about 20 mesh to about 200 mesh, and preferably from about 60 mesh to about 110 mesh. A printing screen of less than about 20 mesh will not hold photosensitive emulsion while a printing screen of more than about 200 mesh tends to be blocked by the coloring medium. The preferred mesh is at least about 60 mesh to facilitate application of photosensitive emulsion, but no more than about 110 mesh to allow sufficient coloring medium to pass through without plugging. Printing screen having mesh in this range provides a detailed design and will clean up easily. Any printing screen material having the mesh characteristics described herein may be used. One such 110 mesh printing screen material is available from the Tubelite Company, Inc., of Altamonte, Fla., U.S.A., under the name of Pecap-Monofilament Polyester, fabric number 7–110T, having nominal mesh opening, thread diameter, and fabric thickness of about 0.0059 inches, about 0.0031 inches, and about 0.0055 inches, respectively, and about 42% open area.

In carrying out the invention, the printing screen 20 is tautly mounted to a screen frame 22. The screen frame 22 is preferably made of lightweight, strong materials such as aluminum or plastic which retains its structural integrity when formed and employed as a supporting structure for the tensioned printing screen 20. The screen frame 22 can also be made of wood or angle iron which has been cut to length and mitered to form the screen frame 22. Wood can be used but has the disadvantage of a tendency to warp and to be heavy and cumbersome when used to frame a large printing screen. Angle iron is hard to work with and must be drilled or welded to form the screen frame and is also heavy when used with large printing screens. The preferred screen frame material is aluminum because it is lightweight and easy to work with, cut, and drill. Alternatively, the screen frame may be of unitary construction formed by extrusion, casting or other known techniques. The printing screen 20 is tautly stretched across the central opening of the screen frame 22 and secured about its edges to the screen frame 22 in any manner known in the art.

Coloring medium 16 may be applied to the mesh material 14 through the printing screen 20 free-hand. Alternatively, it is also possible to first selectively block portions of the printing screen 20 in the form of a decorative design 18 which is to be reproduced on the mesh material 14 to prohibit passage of coloring medium 16. The remaining portions of the printing screen 20 remain unblocked having the design represented by an opening or openings formed therein through which coloring medium 16 can pass to be deposited on the mesh material 14.

One means for selectively blocking portions of the printing screen 20 is to overlay the printing screen 20 with a conventional stencil. Preferably, a screen stencil 12 is formed by any conventional method for creating a screen printing stencil. As briefly described above, screen printing involves the use of a printing screen 20 which has been processed to block selected holes in the printing screen 20 in such a way that the open and closed screen holes form a pattern corresponding to the image 18 to be printed thereby forming the screen stencil 12. As will be more fully described below, this screen stencil 12 is formed by stretching a printing screen 20 tightly across a screen frame 22 to which at least two opposite edges of the printing screen 20 are firmly secured to maintain the printing screen 20 in taut condition. The printing screen 20 is then coated with a liquid photosensitive emulsion and photo-exposed to create a design 18.

In the preferred method of creating the screen stencil 12, after the printing screen 20 has been mounted to the screen frame 22, a liquid photosensitive emulsion is applied and allowed to dry. Any suitable photographic emulsion which is resistant to the coloring medium 16 and its cleaners may be used. For example, where the mesh material 14 is vinyl insect or porch screen, the emulsion must be resistant to vinyl inks and paints and their cleaners. One such emulsion is that available from Tubelite Company, Inc., of Altamonte, Fla., U.S.A., under the name Ulano® TLX® Emulsion, although any other suitable emulsions may be used.

The emulsion-coated printing screen is then photo-exposed by beaming a strong light around an opaque design, comprising a positive film image of the source art work or its equivalent, to harden all of the emulsion not masked from the light by the opaque portions of the design. To complete the screen stencil, the exposed printing screen is then rinsed with water to remove all unexposed emulsion. The hardened emulsion functions to block that portion of the screen which is not intended to pass coloring medium. This preferred method of creating a printing screen stencil design is well known in the screen printing art.

After the printing screen has been mounted, photo exposed, rinsed and dried, the printing screen 20 is positioned adjacent the mesh material 14. The distance between the back of the printing screen 20 and the front of the mesh material 14 is important to the finished look of the decorated mesh material 14. The printing screen 20 and the mesh material 14 must be almost touching in all areas where the stencil design 18 will be reproduced.

The method of application of coloring medium 16 to the mesh material 14 is preferably at a distance between the back of the printing screen 20 and the front of the mesh material 14 of about ¼ inches to about the point of touching the mesh material 14. If the screen stencil 12 is more than about ¼ inches from the mesh material 14, the design will be blurred or fuzzy because the applied coloring medium 16 will be dispersed slightly larger than the screen stencil 12 design. If the back of the printing screen 20 and the mesh material 14 surfaces are allowed to touch and rub, some of the coloring medium 16 will be rubbed off or the decorative design will be smeared. The preferred distance between the back of the printing screen 20 and the mesh material 14 is at least about 1/64 inches to prevent smearing but no more than about ⅛ inches to produce a crisp and clear finished piece.

The printing screen 20 can be releasably secured to the mesh material 14 to be decorated which, as discussed above, has also been securely mounted to a holder such as a frame 24. The respective flames 22 and 24 can be configured so that the back of the printing screen 20 is maintained a predetermined distance from the mesh material 14 to be decorated. Any suitable means may be used to releasably secure the frames 22, 24 including any type fastener such as clamps, screws or the like. Preferably, the frames 22, 24 are secured using hinges 30 to allow movement of the printing screen 12 relative to the mesh material 14 for checking progress or cleaning without affecting the alignment thereof.

The secured printing screen 20 and mesh material 14 may then be placed on a level surface, such as a horizontal table, or an easel 34 for application of the coloring medium 16.

The step of applying a coloring medium 16 through the printing screen 20 comprises spraying the liquid coloring medium 16 through the printing screen 20 to the exposed, facing surface of the mesh material 14. The term "spraying" as used herein means to disperse or project a jet of vapor or finely divided coloring medium 16. As noted above, applying the coloring medium 16 can be done free-hand or around selectively blocked portions of the printing screen 20, as with a screen stencil 12. The step of applying a coloring medium 16 through the screen stencil 12 comprises spraying the liquid coloring medium 16 through the screen stencil 12 wherever the design area 18 has been exposed. The liquid coloring medium 16 will thus be deposited on the exposed, facing surface of the mesh material 14. Accordingly, a clear and sharp design is formed on the mesh material 14 of an image 18 corresponding to the hole pattern of the screen stencil 12.

A painting tool 32 designed to spray coloring medium 16 onto a surface with the use of compressed air, or other suitable applicator, is employed to spray or otherwise apply the coloring medium 16 onto the exposed, facing areas of the mesh material 14. The coloring medium 16 is preferably applied using commercially available air-painting tools such as an air brush 32 and the like. Such tools vary widely in terms of sizes and tip and needle-cone combinations. A suitable air brush is the VL3 Paasche air brush available from Paasche Airbrush Company located in Harwood Heights, Ill., U.S.A., although any other airbrush suitable for painting posters, displays and ceramic finishing may be used. Industrial-type air painting tools and pressurized pots are also adaptable for use in the method of the present invention 10 to spray higher viscosity coloring medium 16 with less air, which allows for better control.

The coloring medium 16 must be compatible with the properties of the mesh material 14 to be decorated and with the painting tool 32 being used. For example, vinyl insect or porch screen typically comprises woven fiberglass strands with a polyvinyl chloride coating. The coloring medium 16 for this application should therefore adhere to the polyvinyl chloride coating. Similarly, aluminum screen or other mesh material 14 will require suitable coloring medium 16. For outdoor use, the coloring medium 16 should be durable against exposure to adverse weather conditions. The preferred coloring medium 16 is ink or paint. Any suitable ink or paint may be used. Vinyl ink for vinyl insect or porch screen is available from KC Coating of Lionize, Kans., U.S.A., under the name of System 2 Gloss Vinyl Screen Ink. This ink dries in minutes with no forced heat and can be thinned for use with an air brush, paint guns and the like.

The proper force for spraying the coloring medium 16 through the printing screen 20 is required. In accordance with the method of the present invention 10, the coloring medium 16 is disbursed in a manner that allows small particles of coloring medium 16 to stick to the surface of the mesh material 14. Thus the correct amount of spraying force to disburse coloring medium 16 through the printing screen 20 onto the exposed facing surface of the fibers of the mesh material 14 is desirable. Too much spraying force will cause paint to appear faintly on the back of the mesh material 14 because too much coloring medium 16 penetrates the printing screen 20. If an insufficient amount of spraying force is used, an insufficient amount of coloring medium 16 will be forced through the stencil screen 12 to provide a detailed design.

The amount of spraying force needed to operate the application tool 32 is equivalent to the amount of spraying force required to spray an equally viscous coloring medium 16 at a close distance onto a hard smooth surface, such as plexiglass, without causing the coloring medium 16 to run. One approach to ascertaining the proper spraying force is by starting at the lowest spraying force needed to spray a certain viscosity of coloring medium 16 through a painting tool 32 and progressively increasing the force in small increments until an appropriate spraying force is reached. For example, where a compressed air-powered painting tool 32 is used, such as an airbrush, with 110 mesh printing screen 20 and vinyl ink, the preferred spraying force is an air pressure is about 30 to about 40 pounds per square inch. Of course, the spraying force will vary depending on the nature of the painting tool 32.

The viscosity of the coloring medium 16 is also a factor in selecting the proper spraying force. In keeping with the method of the present invention 10, the viscosity of the coloring medium 16 can be adjusted. For example, a coloring medium 16 of higher viscosity applied at high spraying force will allow for a greater application distance from the printing screen 20. This consequently allows for a wider spray pattern covering a wider area more quickly. Likewise, a lower viscosity coloring medium 16 and less spraying force results in fine control because of the smaller spray patterns which can be applied at close range. Additionally, some air painting tools 32 might require the thinning of coloring medium 16 for operation. Where thinners are used, they should match the ink formulas. For example, the typical viscosity of System 2 Gloss Vinyl Screen Ink from KC Coating of Lionize, Kans., U.S.A., ranges from less than about 8000 centipoise for yellows and transparent colors to about 11,000 centipoise for white. This ink is thinned by about 20% to about 40% by volume using KC Coating's System 2 Gloss Vinyl Retarder.

In accordance with the method of the present invention 10, the mesh of the printing screen 20, the distance between the printing screen 20 and the mesh material 14, the amount of force used to spray the coloring medium 16 through the printing screen 20, the viscosity of the coloring medium 16, and the type of painting tool 32 used are all important. The coloring medium 16 viscosity, spraying force and painting tool 32 must be compatible with the mesh of the printing screen 12 in order to achieve the correct deposit of coloring medium 16 on the mesh material 14. For example, as described above, a fine printing screen 20 mesh requires one to utilize thinner coloring medium 16 and more spraying force which in turn permits a close spraying distance for greater detail. A coarser printing screen 12 mesh requires the user to employ thicker coloring medium 16, less spraying force and a greater application distance which, in turn, creates a larger spray pattern and results in less control for detail work.

In accordance with the present invention 10, coloring medium may be applied through the printing screen 20 to only the exposed, facing surface of mesh material 14. Further in accordance with the present invention 10, relatively complex single and multi-colored designs and/or lettering can be printed on mesh material 14 by simply applying coloring medium 16 in the design areas on the exposed, facing surface of the mesh material 14 where that choice of color is to appear. Any number of colors may be applied. It should be noted that in working with dark mesh material 14, a first layer of white coloring medium covering the entire facing surface of the mesh material is recommended before additional colors are applied to the design areas.

A common problem associated with multi-color printing is the alignment or registration of printing screens. Through the process of the present invention 10, the printing screen 20 can be pivotally removed from adjacent the mesh material 14 using the hinge bracket in order to check progress or for cleaning. In this manner, the frames 22, 24 remain properly aligned for perfect registration. A clear, multi-color pattern can be rapidly and repetitively reproduced in a cost-effective manner. Alternatively, when a multi-color design is to be applied to the mesh material 14, a set of individual printing screens 20 may be used with each screen 20 being used for the application of a different color. Each subsequent printing screen 20 can be easily aligned providing proper registry between the subsequent screen flames 22, 24.

After the application of the coloring medium 16 is complete, the decorated mesh material 14 is removed, dried and cured. Drying and curing is accomplished by means well known in the art.

The method of the present invention has many advantages, including the decoration of mesh material to a high level of detail. By the method of the present invention, wherein paint or ink is can be sprayed through a stencil made of screen mesh, one can create images on mesh materials which are not visible from the undecorated side. Using a screen stencil 12 allows for greater detail than any open, cut-out stencil. The fact that such great detail can be achieved results in the possibility of a wide range of very intricate designs. The end result is a visually stunning, unique product that has many practical benefits including as an advertisement or for conveying other useful information, as well as giving the user tremendous opportunity to impart his own personality to the mesh material. Any design imaginable is possible. Furthermore, the decorated mesh material is washable and durable.

Printing screens made with liquid emulsions resist chemicals and last longer than any other materials that can be used in this method. The printing screen is thus very durable and can be used and cleaned hundreds of times permitting repeat production runs.

The method of the present invention also allows any size of mesh material 14 to be decorated. The method is inexpensive and does not require expensive or esoteric tools. One does not have to be artistic to decorate mesh material.

While the present invention has been described in considerable detail in connection with a preferred procedure thereof, it will be understood, of course, that I do not intend to limit the invention to that procedure since modifications may be made by those skilled in the art, particularly in light of the foregoing teachings. For example, the type mesh materials to be decorated are not limited to insect or porch screen nor is the printing screen material limited to screen printing screen. Therefore, the spirit and scope of the appended claims should not be limited to the description of the preferred versions contained herein.

What is claimed is:

1. A method for decorating a mesh material, the method comprising the steps of:

a. providing a printing screen;

b. positioning the printing screen adjacent the mesh material; and c. spraying a coloring medium on the areas of the mesh material which are exposed through the printing screen wherein the applied coloring medium is visible from only one side of the decorated mesh material leaving the open areas of the mesh material substantially unfilled and the airflow and visibility through the mesh material substantially undiminished.

2. The method as recited in claim 1, wherein the step of providing a printing screen comprises providing a printing screen having a mesh count and mesh openings corresponding to the mesh count and mesh openings of conventional screen printing screens.

3. The method as recited in claim 1, wherein the step of providing a printing screen comprises providing a printing screen having a mesh count sufficiently low that the printing screen is not plugged by the coloring medium.

4. The method as recited in claim 1, wherein the step of providing a printing screen comprises providing a printing screen having a mesh count of at least about 20 threads per square inch.

5. The method as recited in claim 1, wherein the step of providing a printing screen comprises providing a printing screen having a mesh count up to about 200 threads per square inch.

6. The method as recited in claim 1, wherein the step of providing a printing screen comprises providing a printing screen having a mesh count of from about 20 to about 200 threads per square inch.

7. The method as recited in claim 1, wherein the step of providing a printing screen comprises providing a printing screen having a mesh count of from about 60 to about 110 threads per square inch.

8. The method as recited in claim 1, wherein the step of providing a printing screen comprises providing a printing screen having a mesh count of at least about 60 threads per square inch.

9. The method as recited in claim 1, wherein the step of providing a printing screen comprises providing a printing screen having a mesh count of up to about 110 threads per square inch.

10. The method as recited in claim 1, wherein the step of positioning the printing screen adjacent the mesh material comprises positioning the printing screen sufficiently close to produce a detailed design.

11. The method as recited in claim 10, wherein the step of positioning the printing screen adjacent the mesh material comprises positioning the printing screen at least about 1/100 inches from the mesh material.

12. The method as recited in claim 10, wherein the step of positioning the printing screen adjacent the mesh material comprises positioning the printing screen up to about 1/4 inches from the mesh material.

13. The method as recited in claim 10, wherein the step of positioning the printing screen adjacent the mesh material comprises positioning the printing screen from about 1/100 to about 1/4 inches from the mesh material.

14. The method as recited in claim 10, wherein the step of positioning the printing screen adjacent the mesh material comprises positioning the printing screen from about 1/64 to about 1/8 inches from the mesh material.

15. The method as recited in claim 10, wherein the step of positioning the printing screen adjacent the mesh material comprises positioning the printing screen at least about 1/64 inches from the mesh material.

16. The method as recited in claim 10, wherein the step of positioning the printing screen adjacent the mesh material comprises positioning the printing screen up to about 1/8 inches from the mesh material.

17. The method as recited in claim 1, wherein the mesh material is insect screen.

18. The method as recited in claim 1, wherein the step of spraying the coloring medium on the areas of the mesh material which are exposed through the printing screen comprises spraying at a force sufficiently low that the coloring medium is not applied to the unexposed surface of the mesh material.

19. The method as recited in claim 1, wherein the step of spraying the coloring medium on the areas of the mesh material which are exposed through the printing screen comprises spraying at an air pressure of about 30 to about 40 pounds per square inch.

20. The method as recited in claim 1, wherein the step of spraying the coloring medium on the areas of the mesh material which are exposed through the printing screen comprises spraying at an air pressure of at least about 30 pounds per square inch.

21. The method as recited in claim 1, wherein the step of spraying the coloring medium on the areas of the mesh material which are exposed through the printing screen comprises spraying at an air pressure of up to about 40 pounds per square inch.

22. The method as recited in claim 1, wherein the step of providing a printing screen comprises providing a printing screen wherein the printing screen has a blocked portion thereof blocking passage of the coloring medium through the screen thereat whereby the coloring medium may only pass through the printing screen at the remaining unblocked portion of the printing screen.

23. The method as recited in claim 1, wherein the step of applying a coloring medium is repeated for a different color coloring medium.

24. The method as recited in claim 1, wherein the step of applying a coloring medium comprises applying ink on the areas of the mesh material which are exposed through the printing screen.

25. The method as recited in claim 1, wherein the step of applying a coloring medium comprises applying paint on the areas of the mesh material which are exposed through the printing screen.

26. The mesh material decorated in accordance with claim 1.

* * * * *